United States Patent
Considine et al.

(10) Patent No.: US 6,425,053 B1
(45) Date of Patent: Jul. 23, 2002

(54) SYSTEM AND METHOD FOR ZEROING DATA STORAGE BLOCKS IN A RAID STORAGE IMPLEMENTATION

(75) Inventors: John F. Considine, N. Billerica; Jeffrey T. Wong, Newton, both of MA (US)

(73) Assignee: Adaptec, Inc., Milpitas, CA (US)

( * ) Notice: Subject to any disclaimer, the term of this patent is extended or adjusted under 35 U.S.C. 154(b) by 91 days.

(21) Appl. No.: 09/604,347

(22) Filed: Jun. 27, 2000

(51) Int. Cl.⁷ .............................................. G06F 13/00
(52) U.S. Cl. .............................. 711/114; 710/8; 710/74
(58) Field of Search ............................. 711/114; 710/1, 710/8, 74

(56) References Cited

U.S. PATENT DOCUMENTS 5,640,592 A * 6/1997 Rao ............................. 710/20
6,021,462 A * 2/2000 Minow et al. ............... 711/111

OTHER PUBLICATIONS

David A. Patterson et al., "A case for redundant arrays of inexpensive disks (RAID)", ACM SIGMOD conference proceedings, Chicago Illinois, Jun. 1–3, 1988 p 109–116.*

Guy Harris (guy@netapp.com), "Re: Impact of adding disk to filer", Response on toasters administrators mailing list archive, Oct. 14, 1999 http://teaparty.mathworks.com/toasters/4054.html.*

* cited by examiner

Primary Examiner—Do Hyun Yoo
Assistant Examiner—Paul A. Baker
(74) Attorney, Agent, or Firm—Cesari and McKenna, LLP

(57) ABSTRACT

A system and method for rapidly zeroing/clearing a container in a redundant array of independent disks (RAID) provides the writing of a series of logical zeros to each disk in the container using an internal bus driver-level command. The command causes a small data block of all zeroes written to the disk to be duplicated so that the entire container space in each disk is effectively written-to. The bus driver is preferably a small computer system interface (SCSI) architecture that supports a WRITE SAME command. Where the disk device fails to support the WRITE SAME command then an alternative process is employed, in which a single large sized memory block is created and initial sized with all zeroes. A predetermined number of virtual scatter gather elements are created, each pointing to the memory block. The data in these scatter gather elements is written to the unsupported device so as to clear the entire container space of that device using a smaller block than the overall space requires for complete clearance.

10 Claims, 4 Drawing Sheets

SYSTEM AND METHOD FOR ZEROING DATA STORAGE BLOCKS IN A RAID STORAGE IMPLEMENTATION

FIELD OF THE INVENTION

The invention relates generally to the field of computer systems and more particularly to systems that employ disk storage based upon a redundant array of independent disks (RAID) implementation.

BACKGROUND OF THE INVENTION

A computer system includes an operating system whose primary function is the management of hardware and software resources in the computer system. The operating system handles input/output (I/O) requests from software processes or applications to exchange data with on-line external storage devices in a storage subsystem. The operating system (such as Windows NT® available from Microsoft, Corp. of Redmond, Wa.) forwards I/O requests to an I/O subsystem, which, in turn, converts the logical addresses into physical locations in the storage devices and commands the latter devices to engage in the requested storage or retrieval operations.

The on-line storage devices on a computer are configured from one or more disks into logical units of storage space referred to herein as "containers." Examples of containers include volume sets, stripe sets, mirror sets, and various Redundant Array of Independent Disk (RAID) implementations. A volume set comprises one or more physical partitions, i.e., collections of blocks of contiguous space on disks, and is composed of space on one or more disks. Data is stored in a volume set by filling all of the volume's partitions in one disk drive before using volume partitions in another disk drive. A stripe set is a series of partitions on multiple disks, one partition per disk, that is combined into a single logical volume. Data stored in a stripe set is evenly distributed among the disk drives in the stripe set. In its basic configuration, a stripe set is also known as a "RAID 0" configuration. A mirror set is composed of volumes on multiple disks, whereby a volume on one disk is a duplicate copy of an equal sized volume on another disk in order to provide data redundancy. A basic configuration for a mirror set is known as "RAID 1." There is often a desire to increase data reliability in a stripe set by using parity distributed across storage blocks with respect to each stripe. Where such parity is provided to the stripe set, the configuration is known as "RAID 5." In an even more complex implementation, where stripe sets are mirrored on a plurality of containers—and redundant data is distributed across the stripes, the resulting configuration is known as "RAID 10." Generally speaking, all configurations of the RAID implementation (RAID 0–10) provide a collection of partitions, where each partition is composed of space from one disk in order to support data redundancy.

V-When a RAID 5 container is initially created (preconfigured) within a disk array, there are generally two setup options—either the container is "scrubbed" by generating all parity in combination with the currently resident data; or the container is zeroed by writing successive zeroes across the container storage space. In general, the clearance of a container is accomplished by allocating a sufficiently large amount on-line memory space, initializing the memory space with zeroes via the host CPU/processor, and then writing the stored zeroes into the disk container as one or more blocks. Clearly, each successive write entails a number of steps that occupies significant bus and processor overhead, especially where the overall disk space may occupy 100 gigabytes or more. In addition the speed is limited by overall processor and bus transmission speeds.

It is, therefore, an object of this invention to provide a system and method for zeroing a disk storage space that is more efficient and quicker than conventional zeroing techniques, using minimal processor and bus overhead. This technique should enable selective zeroing of RAID containers during computer processor runtime with minimum demands on the associated data bus.

SUMMARY OF THE INVENTION

This invention overcomes the disadvantages of the prior art by providing a system and method for enabling a disk art arranged as a RAID to be zeroed/cleared largely independent of runtime intervention by the main computer processor and with reduced bus overhead. In a preferred embodiment, the system and method provides the writing of a series of logical zeros to each disk in the container using an internal bus driver-level command. The command causes a small data block of all zeroes written to the disk to be duplicated so that the entire container space in each disk is effectively written-to. The bus driver is preferably a small computer system interface (SCSI) architecture that support a WRITE SAME command. Where the disk device fails to support the WRITE SAME command then an alternative process is employed, in which a single large sized memory block is created and initialized with all zeroes. A predetermined number of virtual scatter gather elements are created, each pointing to the memory block. The data in these scatter gather elements is written to the unsupported device so as to clear the entire container space of that device using a smaller block than the overall space requires for complete clearance.

BRIEF DESCRIPTION OF THE DRAWINGS

The foregoing and other objects and advantages of the invention should become clearer with reference to the following detailed description, as illustrated by the drawings, in which.

DETAILED DESCRIPTION OF AN ILLUSTRATIVE EMBODIMENT

Figure 1:
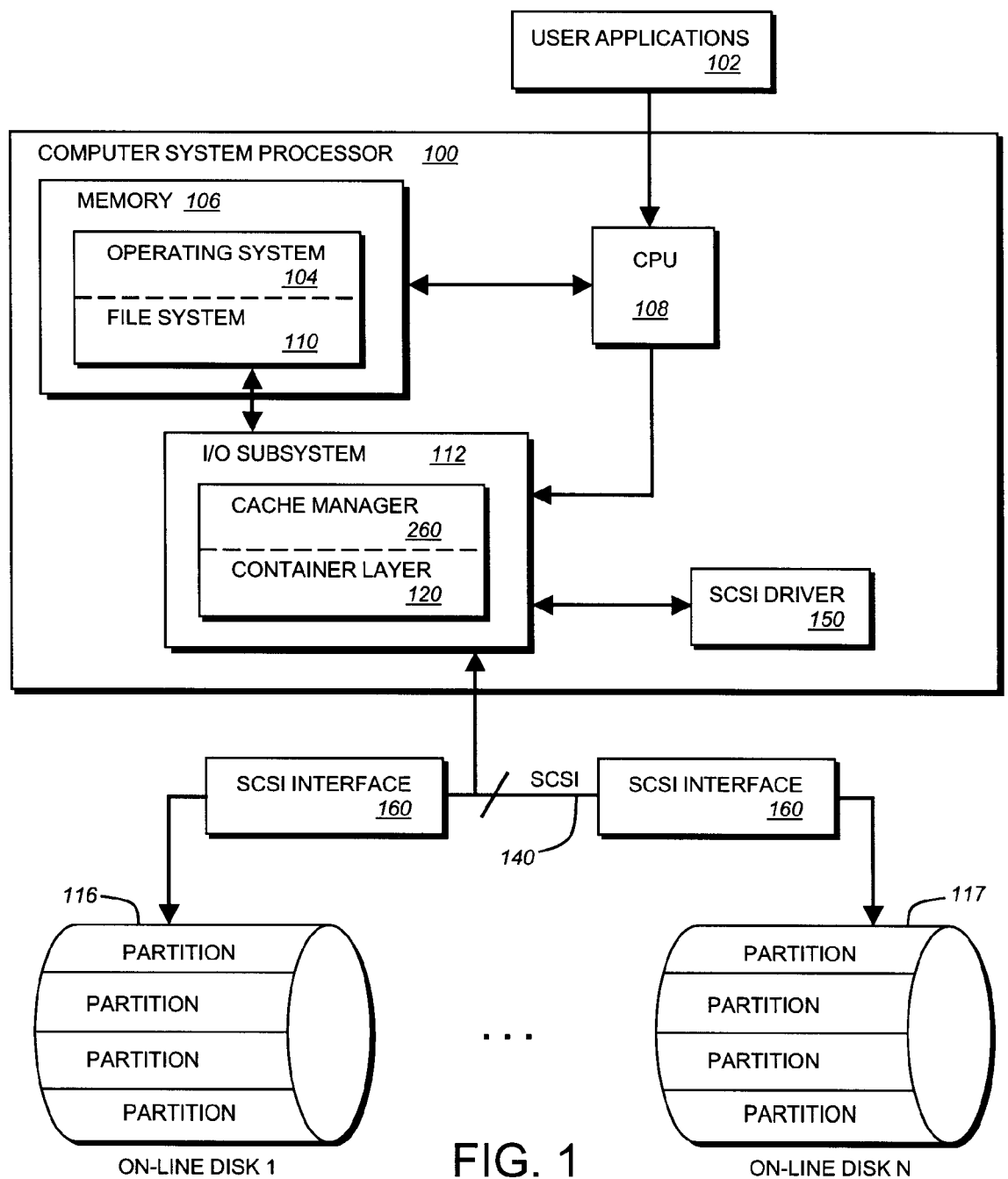
FIG. 1 is a block diagram of a typical RAID storage implementation showing a partitioned set of disks according to the principles of this invention.

FIG. 1 is a schematic block diagram of a typical computer system that is as a RAID 5 storage configuration in accordance with the present invention. The computer system processor 100 comprises a memory 106 and an input/output (I/O) subsystem 112 interconnected with a central processing unit (CPU) 108. The memory 106 comprises storage locations addressable by the CPU 108 and I/O subsystem 112 for storing software programs and data structures. An operating system 104, portions of which are typically resident in the memory 106 and executed by the CPU 108, functionally organizes the computer processor 100 by, inter alia, handling I/O operations invoked by software processes or application programs executing on the computer. The I/O subsystem 112 is, in turn, connected to a set of on-line storage devices 116. These on-line storage devices 116 are partitioned into units of physical space associated with the inventive copy-on-write procedure described herein. The storage devices (disk drives) are typically interconnected via a small computer system interface (SCSI) bus 140 having a driver circuitry shown as generalized block 150. This circuitry may be distributed throughout the system in both hardware and software. Each disk drive is connected to the bus via appropriate SCSI interface circuitry 160 known generally to the art.

User applications 102 and other internal processes in the computer system invoke I/O requests from the operating system 104 by file names. A file system 110, which is a component of the operating system 104, translates the file names into logical addresses. The file system 110 forwards the I/O requests to a I/O subsystem 112 which, in turn, converts the logical addresses into physical locations in the storage devices 116 and commands the latter devices to engage in the requested storage or retrieval operations. The I/O subsystem 112 configures the partitions of the physical storage devices 116, 117 into containers and stores container configuration tables in the container layer 120 of the I/O subsystem 112. Container configuration enables the system administrator to partition a disk drive into one or more virtual disks. In addition, a cache manager 260 and corresponding cache memory operates in association with the I/O subsystem 112 as is described further below.

Figure 2:
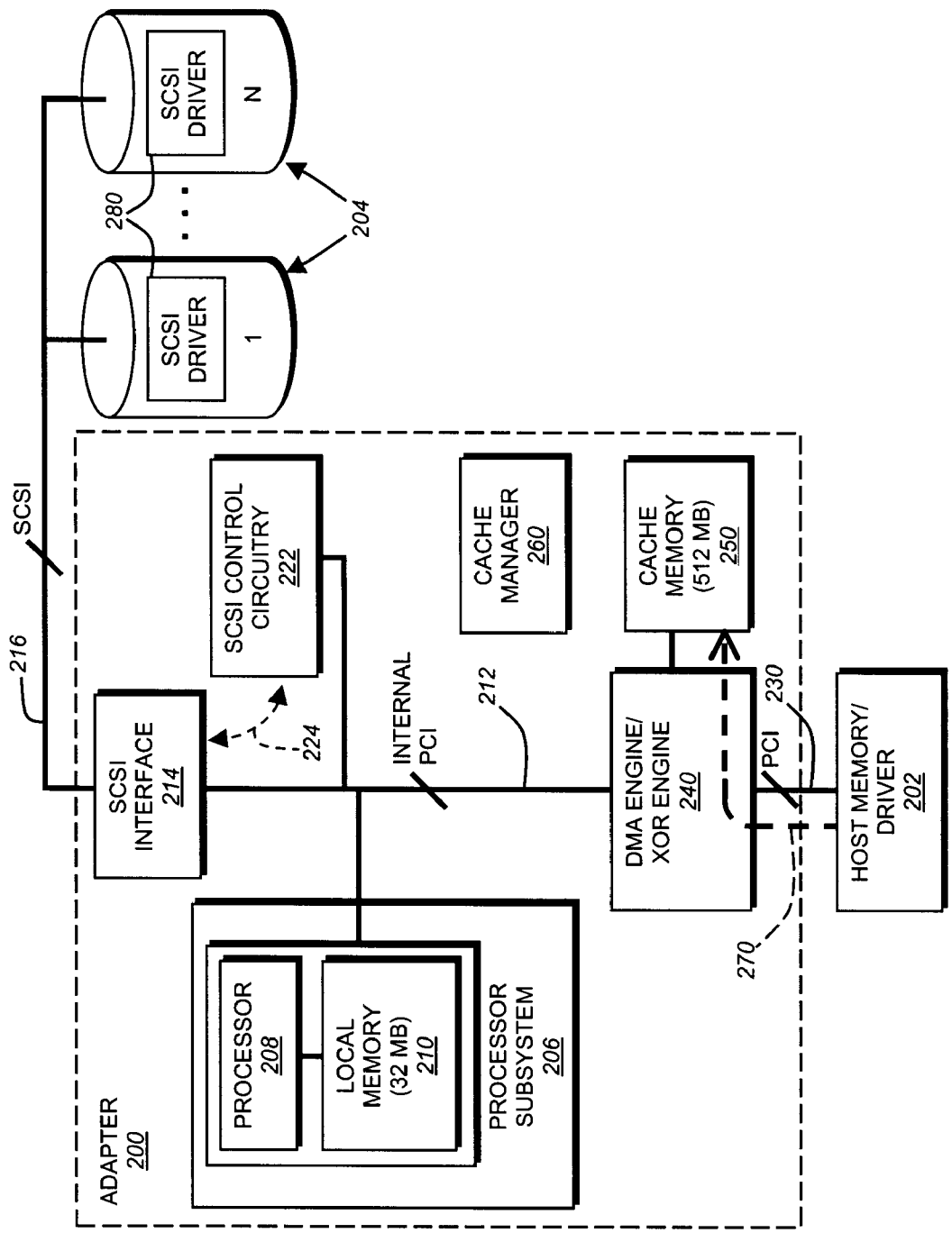
FIG. 2 is a more detailed block diagram showing an adapter for handling data storage and associated disk array associated with the system and method of this invention.

With further reference to FIG. 2, a modified adapter 200 is provided to handle memory storage between the host memory and its associated driver 202 and the RAID disk storage array 204. A processor subsystem 206 is provided including an on-board processor and a local memory 210. The local memory in this embodiment is a 32-megabyte array. However the size and configuration of this memory is highly variable. The processor subsystem is interconnected along an internal peripheral component interconnect (PCI) bus 212. The internal PCI bus 212 is, itself, terminated in a SCSI bus interface 214 that supports a small computer system interface (SCSI) bus 216 extending to the RAID storage array 204. As described above, the disks of the array are arranged in a group of containers according to a desired storage configuration (RAID 5 for example).

The SCSI functions and parameters are controlled by a set of SCSI control circuits/chips 222, generally resident on the PCI bus (a 64-bit PCI in this embodiment) and also in direct connection (dashed line 224) with the SCSI interface 214.

The host memory/driver 202 is interconnected with the adapter via an external PCI bus 230. The connection is specifically made through a direct memory access (DMA) engine 240 according to this invention. The DMA engine 240 is an application specific integrated circuit (ASIC) having an architecture that is adapted to carry out the unique detection function according to this invention.

The DMA engine is also interconnected to an on-board cache memory 250. The cache memory is adapted to store blocks passing between the host and the disk array, and has a size of 512 megabytes in this embodiment. The size and configuration of this memory is, again, variable depending upon system requirements and application. Typically, it is a non-volatile, battery-backed-up storage device designed to ensure that data is reliably maintained before and during transfer to the disk array. I/O operations are essentially complete from a processor perspective when data is cached, since the manager can, at a remote future time (if necessary), perform the final transfer to the disk array independently. Direct disk access functions are, therefore governed by the cache manager 260 according to this embodiment. In general, when data is written by the host to appropriate addresses in the disk array 204 the cache manager to intervenes and initially places the write data into the cache 250 for subsequent transfer down the SCSI bus 216 via the SCSI interface 214.

Generally, the DMA engine enables direct, high-speed caching of data from the host to the cache (dashed line 270) and on to the disk array without direct host processor intervention under the control of the cache manager. When a write to the disk from the host of a data block is instructed, the block is initially transmitted down the bus arrangement, and stored in the cache memory 250. Again, this occurs by action of the DMA engine 240 free of CPU intervention. The DMA then transfers the blocks from the cache to the disk assembly, also free of intervention. The cache manager particularly facilitates addressing and storage of blocks in the cache. Blocks are typically 4K–8K byte in this embodiment.

Two related approaches will now be described herein for performing the rapid clearing/zeroing of a disk space according to this invention. While all zeroes are used to clear herein, all logical "ones" can be readily substituted.

The system and method of this invention employs a SCSI-based WRITE SAME command. A reference to this command is provided in *Information Technology—SCSI Primary Commands—2*(SPC—2) by the American National Standards Institute (Revision Jul. 11, 24, 1999). See, for example, Annex B therein. Note, in general the system and method herein initially attempts to employ the following WRITE SAME command technique for zeroing. However, if the vendor of a particular disk drive or other device does not support (or incorrectly supports) the WRITE SAME command, then the system and method described herein will employ an alternate scatter gather element approach for that device to accomplish zeroing. Any device in the overall computer/storage architecture that supports the WRITE SAME command in accordance with this invention will continue to employ the command notwithstanding the failure of one or more devices in the architecture to properly support it.

By way of further background, the speed in which a container is zeroed depends generally upon three factors. First is the operational speed of the physical disk or disks that define the particular container. Second is the number of disks used in the array, and the third factor is the total available SCSI bus bandwidth. When a large number of "fast" disks are employed, the bus bandwidth stands as the main limiting factor to zeroing speed. In a typical container clearing process, blocks of data containing all zeroes must be written to each of the devices in the disk array. Since data is typically written to each device individually, the total amount of data transferred across the bus is equal to the cleared space size time the number of disk drives/devices. Note that while data is transferred to one device, the other devices must wait.

In general, the WRITE SAME command technique uses a small block of data to perform the container clearing operation. This small block of data is automatically replicated inside each drive by operation of the WRITE SAME command. This occurs without transmission of the block over the bus, at the level of the SCSI interface architecture (160) associated with each disk 1–N. Accordingly bus bandwidth is immediately reduced, relative to conventional zeroing techniques, by a factor of the cleared size divided by the block size. In this embodiment, the cleared-container size is approximately one-megabyte (1,048,576 bytes=16 disks X 64K bytes each), and the block size is 512 bytes. Hence the bandwidth requirement is reduced by 2,048 times according to this embodiment. This reduction in bandwidth allows the clearance to proceed at maximum disk write speed, and makes bus usage essentially insignificant with respect to the number of disks being cleared (e.g. bus is not occupied with a single disk while others wait, regardless of the number being cleared).

Where one or more devices fail to properly support the WRITE SAME command so as to replicate the specified block of data, the virtual scatter gather element method, according to this invention is substituted for the non-conforming device(s). Again, by way of background, the conventional clearing technique usually involves the use of large-size data writes to the disk (e.g. a multiplicity of blocks—all zeroes) to speed the process. Since the SCSI protocol has significant overhead in command initiation and completion sequences, larger amounts of data reduce overall SCSI command overhead by reducing the number command events (e.g. large blocks transferred fewer times). However, the disadvantage of large data transfers is that it typically occupies significant memory resources in order to cache/buffer the write data. In general, the clearance write to each disk requires the use of a data buffer at least equal in size to the associated disk clearance size.

Figure 3:
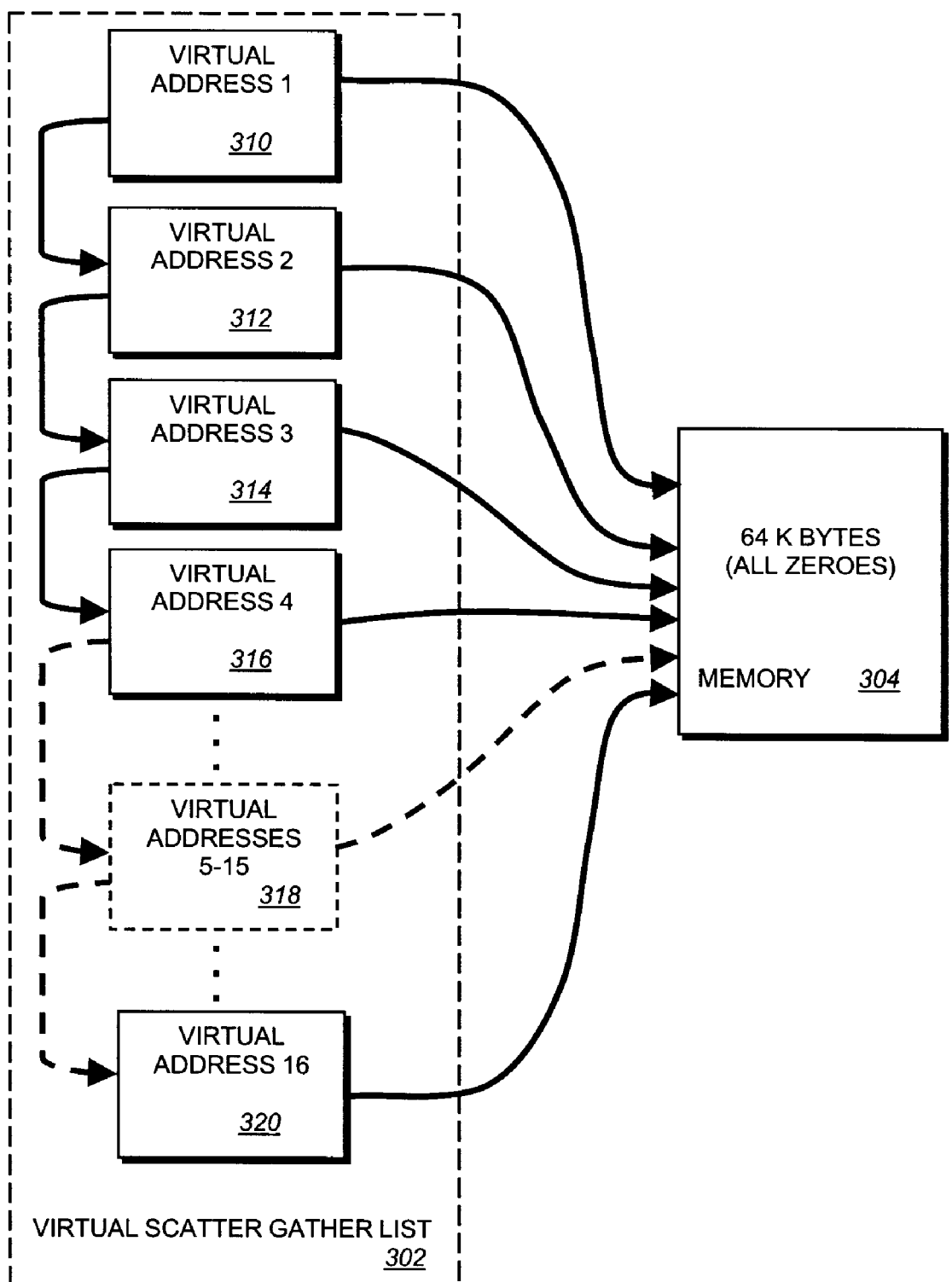
FIG. 3 is a schematic diagram of a virtual scatter gather element for use with the system and method of this invention.

The virtual scatter gather element according to this invention overcomes the above-described resource limitations by creating a single, smaller-sized memory block, and manipulating the SCSI command so as to repetitively utilize the same memory resource to write over an entire disk clearance space. Reference is made to FIG. 3 that illustrates a virtual scatter gather element 302, and its associated with a memory space 304, according to an embodiment of this invention. The memory 304 is a 64K-byte space according to this embodiment.

In this embodiment, the single memory block 304 of 64 K bytes (65,536 actual bytes) is allocated by the clearance process, and this memory block is filled with zeroes. The scatter gather list 302 used with each command contains sixteen elements (310, 312, 314, 316, 318, 320) respectively labeled Virtual Address 1—Virtual Address 16. Each of these virtual scatter gather elements points to the same address in the zero memory block 304. The number of virtual scatter gather elements can be varied. Likewise the size of the large-sized memory block can be varied. Typically, the number of elements is inversely proportional to the size of the block. In this embodiment, sixteen elements times 64 K bytes (65,536 actual) equals 1-Mbyte (1,048,576 bytes actual). This is sufficient to zero a 1-Mbyte container on the unsupported disk device. Therefore, whichever of the devices cannot be zeroed using the WRITE SAME command, is alternatively zeroed by establishing a virtual scatter gather list and associated memory block as shown. The same memory block can used by multiple commands in the zeroing process, thereby providing significant resource savings. Accordingly, the system can issue a large-sized write command with less occupation of system resources using the scatter gather list approach.

Figure 4:
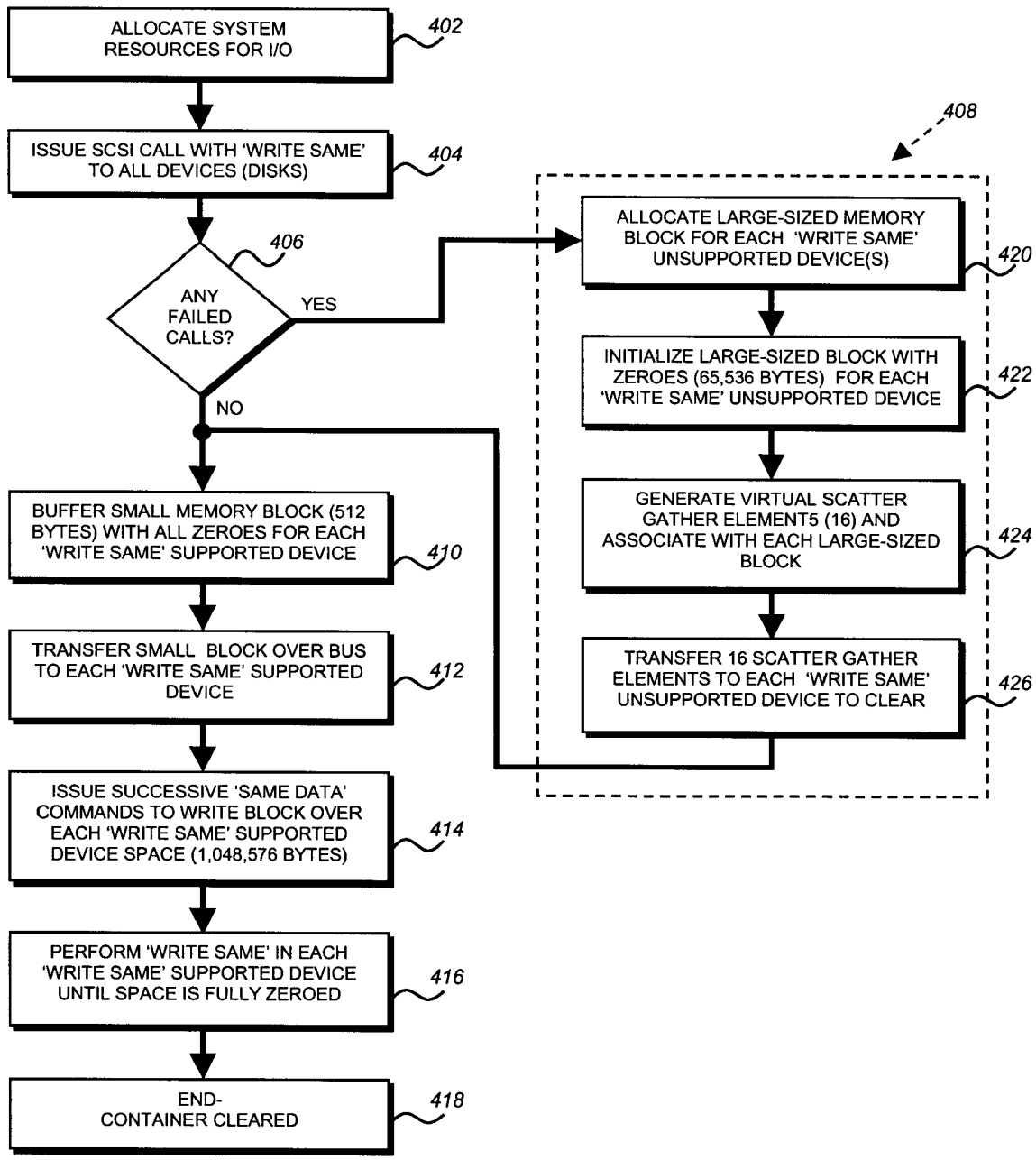
FIG. 4 is a flow diagram illustrating a generalized zeroing procedure according to a preferred embodiment of this invention.

With reference to FIG. 4, an exemplary zeroing process according to this invention is now described in further detail. When the task to zero a container is first instructed, the task begins by allocating enough system resources (memory, bus bandwidth, etc.) to perform an input/output (I/O) operation to all sixteen disks at the same time (step 402). Again, the number of disk devices is widely variable. For example sixty-four separate disks can be provided according to one alternate embodiment.

A SCSI call is then issued with the WRITE SAME function to the SCSI class driver 280 (see FIG. 2) for each sixteen disk devices (step 404). The process then checks if any calls have been returned as failed, implying that the device does not support the command (decision step 406). If any calls are returned as failed, then the task will use a scatter gather list process (grouped steps 408) as described above for particular the nonsupported device(s). The steps 408 are described further below.

For all devices which accept the WRITE SAME call, the task then buffers a small data block filled with all zeroes (step 410). The size of the block is minimized to 512 bytes. This block is transferred to each of the devices (step 412). The task then requests that the WRITE SAME command be repeated to write the 512-byte block fully across the desired disk space of 1,048,576 bytes (step 414). In general, the total size of the desired write is specified to the internal SCSI driver for each device, and the appropriate number of repetitions is made by the device driver (step 416). An internal counting function or other available firmware protocol can be used to monitor for the correct number of repeated writes. When all disks re cleared, the task completes, and the disks return to perform other I/O operations (step 418). Typically, all supported devices will execute the WRITE SAME process substantially simultaneously, thereby significantly increasing overall speed. Since this is an internal operation within each device, the overall zeroing speed is mainly limited by the spin speed of the slowest disk. Because the bus and processor are largely unoccupied during the WRITE SAME process, the task can issue multiple commands to the entire disk array without saturating the bus bandwidth.

As described above, where one or more devices do not comply with the WRITE SAME call, the task utilizes the virtual scatter gather element technique (steps 408) to clear these devices. The scatter gather process can occur at any time before, during or after the clearance of devices using the preferred WRITE SAME technique. Hence the order of the process shown in the flow diagram of FIG. 4 is by way of example only. The task begins by allocating a large-sized block (65,536 bytes) of memory (step 420). This block is then initialized with zeroes (step 422). Then sixteen virtual scatter gather elements (302) are created and pointed to the same memory block (304), thus generating a 1,048,576-byte scatter gather list using sixteen discrete 65,536-byte scatter gather elements (step 422). The resulting sixteen elements are each written to the disk space, each containing the data of the same memory block (step 426).

The resulting combined process including WRITE SAME and scatter gather techniques can clear a container substantially faster than a conventional approach. In a typical RAID 5 configuration, the speed is often increased by six to eight times or more. Where more disks are used, the resulting increase in speed over a conventional approach is even greater (over twenty times greater for sixty-four disks).

Overall process speed can be further enhanced by applying automatic block detection and optimization techniques such as those described in commonly assigned U.S. patent application Ser. No. 09/604,348, filed on Jun. 27, 2000 entitled *System and Method for Detecting Disk Storage Blocks Containing Unique Values* by Eric S. Noya, the teachings of which are expressly incorporated herein by reference. This system and method teaches the detection of blocks in which repetitive patterns (all zeroes, for example) transmitted over the bus to the cache memory for writing to the disk. Such blocks, when detected by an enhanced DMA engine, are omitted from the cache, flagged for their location in the data stream, and written to disk without direct transmission over the bus, thus freeing bandwidth where repetitive blocks are found. In this manner, even quicker transfer of blocks to the disc array for use with the clearance process can occur.

The foregoing has been a detailed description of a preferred embodiment of the invention. Various modifications and additions can be made without departing from the spirit and scope thereof. For example, the number of zero-block copies made in a particular copy sequence can be widely varied and/or an entire disk space can be zeroed in a single copy sequence without returning to the main computer processor in the interim. In addition, while a SCSI bus architecture is specified, other architectures that support similar peripherals, functions and commands can be substituted for those described herein. Accordingly, the term "write same" should be taken broadly to include other commands and operations that enable the repetitive writing of data to one or more devices internally, without bus transmission of the repetitive writes. Finally, the use of zeroes is exemplary and the disk can be selectively provided with copied values having any logical state or a combination of logical states as desired. The terms zeroing and/or clearing, should be taken broadly to include the provision of all logical "ones" where appropriate. For example, large numbers of ones are used in a bitmap image background. This invention facilitates the rapid storage of such values. Additionally, while a RAID 5 configuration is embodied in this description, it is expressly contemplated that the principles of this invention can be applied to other types/levels of RAID, and to other types and configurations of data storage. Finally, while the small sized block is chosen to contain 512 bytes and the large-sized block contains 65,536 bytes, these numbers are highly variable, and can be changed to suit the particular standards of the system (e.g. normal block size, bandwidth, etc.). Hence the terms "small block" and "large block" as used herein refer to the relative size of these data structures with respect to each other and in view of the overall container size (example—1 Mbyte). Accordingly, this description is meant to be taken only by way of example, and not to otherwise limit the scope of this invention.

What is claimed is:

1. A system for writing repetitive data across a predetermined group of disk storage locations in a disk array, the disk array being interconnected to a main computer processor through an input/output (I/O) bus that comprises a small computer system interface (SCSI) bus, and the disk array having a disk array-based driver structure for acting upon predetermined bus-based commands, the system comprising:
 a buffer for storing a small block of the repetitive data for writing to the disk array, wherein the disk array comprises a redundant array of independent disks (RAID) having a plurality of disk devices arranged to collectively define a plurality of containers and wherein the internal driver structure comprises a plurality of internal bus-based drivers interconnected with each of the plurality of disk devices, respectively;
 means for transmitting the small block of the repetitive data and a bus-based write same command over the bus to the disk array, the bus-based write same command being received by the driver structure;
 wherein the internal driver structure is constructed and arranged to cause the disk array to write the small block of the repetitive data for predetermined number of repetitions across the predetermined group of disk storage locations until the group of disk storage locations are all provided with the repetitive data from the small block of the repetitive data; and
 wherein the internal driver structure is further constructed and arranged to identify whether one of the plurality of internal bus-based drivers fails to support the write same command, and further comprising a large-sized memory block that is larger than the small block of the repetitive data and the large-sized memory block having the repetitive data stored therein, wherein the internal driver structure is adapted to write the large-sized memory block to the disk device having the internal bus-based driver that fails to support the write same command.

2. The system as set forth in claim 1 further comprising a scatter gather list having a plurality of virtual scatter gather elements that each point to the large-sized memory block, wherein the virtual scatter gather elements are each adapted to be written to the disk device having the internal bus-based driver that fails to support the write same command.

3. The system as set forth in claim 2 wherein the repetitive data comprises a group of logical zero values.

4. The system as set forth in claim 1 wherein the repetitive data comprise a group of logical zero values.

5. The system as set forth in claim 1 wherein the repetitive data comprise a group of disk-initilization values.

6. A method for writing repetitive data across a predetermined group of disk storage locations in a disk array, the disk array being interconnected to a main computer processor through an input/output (I/O) bus that comprises a small computer system interface (SCSI) bus and the disk array having a disk array-based driver structure for acting upon predetermined bus-based commands, the method comprising:
 configuring the disk array as a redundant array of independent disks (RAID) having a plurality of disk devices arranged to collectively define a plurality of containers and defining the internal driver structure as a plurality of internal bus-based drivers interconnected with each of the plurality of disk devices, respectively;
 buffering a small block of the repetitive data for writing to the disk array;
 transmitting the small block of the repetitive data and a bus-based write same command over the bus to the disk array, the bus-based write same command being received by the driver structure;
 writing, based upon the internal driver structure, the small block of the repetitive data for predetermined number of repetitions across the predetermined group of disk storage locations until the group of disk storage locations are all provided with the repetitive data from the small block of the repetitive data; and
 identifying, with the internal driver structure, whether one of the plurality of internal bus-based drivers fails to support the write same command, and further comprising generating a large-sized memory block, the large-sized memory block being larger than the small block of the repetitive data and the large-sized memory block having the repetitive data stored therein, and writing the large-sized memory block to the disk device having the internal bus-based driver that fails to support the write same command.

7. The method as set forth in claim 6 further comprising generating a scatter gather list having a plurality of virtual scatter gather elements that each point to the large-sized memory block, the large-sized memory block being larger than the small block of the repetitive data and the large-sized memory block having the repetitive data stored therein, and writing each of the virtual scatter gather elements to the disk device having the internal bus-based driver that fails to support the write same command.

8. The method as set forth in claim 7 further comprising providing a group of all logical zero values as the repetitive data.

9. The method as set forth in claim 6 further comprising providing a group of all logical zero values as the repetitive data.

10. The method as set forth in claim 6 further comprising providing a group of disk-initialization values as the repetitive data.

* * * * *